United States Patent Office
3,134,761
Patented May 26, 1964

3,134,761
REACTIVE DYESTUFFS CONTAINING ONE OR MORE DISULPHIMIDE GROUP
Hans Ackermann, Riehen, near Basel, and Herbert Seiler, Basel, Switzerland, assignors to J. R. Geigy A.-G., Basel, Switzerland
No Drawing. Filed Apr. 28, 1961, Ser. No. 106,184
Claims priority, application Switzerland Apr. 29, 1960
5 Claims. (Cl. 260—146)

The present invention concerns reactive dyestuffs, processes for the production thereof, their use for the dyeing and printing of fibers as well as the material fast dyed or printed therewith.

Many of the dyestuffs known up to the present which enter into a chemical reaction with the fibre contain one or more substituted amino groups, the substituent of which contains at least one radical which can be easily split off as anion, for example, halogen. These substituted amino groups, which are advantageously halogen azinylamino groups, are generally linked direct to the aromatic radicals of the dyestuff molecule. To attain certain properties, however, e.g. to attain certain particularly pure shades, this substitution is undesirable.

If it is attempted to remove the amino group containing the reactive radicals to external groups, the difficulty arises that large substituents reduce the very good water solubility and often increase to an undesirable extent the substantive properties. For example, when substituted aminobenzoylamino groups are substituents of the dyestuff molecule, this often is the case. Also it is often impossible in phenylazo dyestuffs to include in the phenyl radical the desired substituents, e.g. acylamino, sulphonic acid and other groups.

It has now been found that dyestuffs which, in addition to at least one substituted amino group containing reactive radicals, contain one or more disulphimide groups —SO$_2$—NH—SO$_2$—, are valuable reactive dyestuffs which are distinguished, principally, by their good water solubility and the property of producing very pure cellulose dyeings. The disulphimide groups give to the dyestuffs containing them not only good water solubility but also enable the inclusion of water solubilising substituents or substituents which promote water solubility, in that these can be introduced into the aryl radical bound to the disulphimide group or can be contained therein. This external aryl radical can also contain the substituted amino group having reactive radicals without the undesirable properties mentioned above occurring.

Dyestuffs according to the invention are obtained by condensing a dyestuff containing a disulphimide group of the general formula

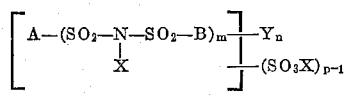

(I)

wherein
A represents the radical of an organic dyestuff,
B represents a possibly substituted hydrocarbon radical which can also contain chromophoric groups,
X represents a hydrogen atom or the equivalent of a cation,
Y represents an acylatable primary or secondary amino group, and
m, n and p represent whole numbers, whereby m and n should each be at most 2 and p and m together should be at least 3, with a compound which contains at least two radicals which can easily be split off as anions. The condensation is performed under such conditions that the reaction product contains at least one radical bound to the substituents of an amino group, which radical can easily be split off as anion.

Such dyestuffs according to the invention are also obtained by condensing dyestuffs containing disulphimide groups of the general Formula I with compounds which contain a radical easily split off as anion and in addition at least one C—C— multiple bond capable of addition, the condensation being performed under such conditions that in the condensation products there is at least one such C—C— multiple bond.

Principally halides and, sometimes, also anhydrides of aliphatic carboxylic acids containing mobile halogen and/or C—C— multiple linkages capable of addition are used as compounds which contain a radical which can easily be split off as anion and also either at least another such radical or at least one C—C— multiple bond which is easily capable of addition. Examples are the halides or anhydrides of chloroacetic acid, bromoacetic acid, of β-chloro- and β-bromo-propionic acid, of propiolic acid, acrylic acid and methacrylic acid, of α- or β-chloro- or -bromo-acrylic acid, of α,β-dichloro- or -dibromo-acrylic acid, of α, β- or γ-chloro- or -bromo-crotonic acid, of α,β-dichlorocrotonic acid and the possibly chlorinated or brominated maleic or fumaric acids. Preferred compounds having at least two radicals which can be easily split off as anion, are the cyclic imide polyhalides which contain several reactive groupings

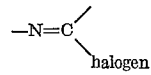

As such, principally the halogen azine compounds of aromatic character are used which contain at least two tertiary N atoms in the ring and at the ring C atoms adjacent thereto contain at least two mobile halogen atoms of the atomic numbers 17–35, i.e. for example, 2,4,6-trichloro- or -tribromo-1,3,5-triazine, 2-alkoxy-, 2-alkyl-, 2-phenyl-, 2-amino-, 2-alkylamino-, 2-phenylamino-, 2-sulphophenylamino-, 2-ureido- or 2-guanidino-4,6-dichloro- or -4,6-dibromo-1,3,5-triazines, 2,4- or 4,6-dichloro- or -dibromo-pyrimidines which, in the remaining positions, contain other substituents, in particular further halogen atoms or negative groups such as nitro, acyl, cyano or also only alkyl or phenyl groups, and, finally, also tetrameric cyanogen chloride or bromide.

In the reaction of the disulphimide dyestuffs containing amino groups with these carboxylic acid halides or carboxylic acid imide halides, the reaction conditions should be so chosen that too previous exchange of mobile substituents does not occur either because of too high a pH value of the reaction medium or because of too high temperature. The reaction is thus performed advantageously with the aqueous solutions of the alkali salts of dyestuffs used according to the invention at the lowest possible temperatures and pH values. Advantageously buffer salts, for example, alkali metal salts of low fatty acids are used as mineral acid buffering agents. The reaction temperature and the pH value of the reaction medium depends on the stability of the acylating or azinylating agent or on the mobility of the radical to be split off as anion. The reaction is performed at temperatures of 0° to about 60° C. and at pH values of about 2 to 8. The acylating or azinylating agents are used in at least equimolecular amounts and, depending on their properties, in fine dispersion, for example as suspensions or emulsions, possibly with the addition of inert organic solvents which are easily removed such as low ketones. The acylating or azinylating agents are allowed to react until the amino group to be acylated can no longer be traced, for example by diazotising and coupling when the amino group is a primary one, which is advantageously the case. The dyestuffs according to the invention must also be isolated and dried with care, for example, by salting out the alkali metal salts with sodium chloride in neutral to weakly acid solution and then drying at a moderately raised temperature, advantageously in vacuo.

A modification of the process according to the invention consists in converting dyestuff intermediate products which possibly already contain chromophoric groups into the corresponding dyestuff. Of these intermediate products, at least one contains one or more disulphimide groups and at least one contains one or more substituted amino groups, the substituents of which contain at least one radical which can easily be split off as anion or at least one C—C— multiple bond capable of addition. In this case the reaction conditions are so chosen that the end product contains at least one radical bound to the substituents of an amino group which is easily split off as anion or it contains at least one C—C— multiple bond capable of addition.

The modified process is used particularly for the production of azo dyestuffs according to the invention. For this purpose, a diazonium compound and an azo component, of which the one or both contains at least one disulphimide group and the other or both contains at least one substituted amino group which can be either exchanged or which contains radicals capable of addition, are coupled at the lowest possible temperature and a not too high pH value to form the azo dyestuff. Apart from disulphimide and substituted amino groups, diazo and azo components can also contain chromophoric groups, e.g. azo groups; in the latter case, disazo or polyazo dyestuffs are obtained.

The azo components having substituted amino groups of the type mentioned which are necessary for this modified process are obtained, for example, from aminohydroxy compounds which can be coupled, such as, e.g. aminohydroxynaphthalene sulphonic acids or 1-aminoaryl-5-pyrazolones, by reacting with 1 mol of one of the polyvalent acylating or azinylating agents mentioned above. Corresponding diazonium compounds are produced, for example, from aromatic diamines, one amino group of which is less reactive than the other, for example because of steric hindrance, but which amino group is still diazotisable, by reacting with 1 mol of one of the acylating or azinylating agents described above and then diazotising.

The dyestuffs of the general Formula I, containing at least one disulphimide group and at least one, advantageously primary, amino group but possibly also acylatable secondary amino group, which are used as starting materials can be of any dyestuff class desired. However, principally those classes of dyestuffs are used which are easily accessible technically and are distinguished by good stability and fastness properties. Thus, in general Formula I, F is principally the radical of an anthraquinone dyestuff or the radical of a metal-free or heavy metal-containing phthalocyanine dyestuff, or it is that of a nitro dyestuff and, in particular, that of an azo dyestuff which possibly contains heavy metal, by which latter expression also the so-called formazyl dyestuffs are included. If the dyestuffs used as starting materials only have one single disulphimide group then, in order to attain sufficient water solubility, they must contain a sulphonic acid group; in general there are in all, advantageously, 3 to 4 acid, salt-forming, water solubilising groups present.

It can be seen from the following description of different dyestuff groups or from the details regarding the production thereof, which dyestuffs are principally used as starting materials in the process according to the invention.

In the preferred azo dyestuffs, disulphimide groups as defined can be in the radical of the diazo component or in that of the azo component or in both radicals. The same is the case with the acylatable, primary or secondary amino groups as defined. If B has no chromophoric group, then advantageously it contains an acylatable amino group. In the preferred dyestuffs, B is an aromatic radical having at most 2 benzene nuclei, in particular the radical of a monoazo dyestuff. In the latter case too, dyestuffs having good water solubility and slight substantivity are obtained, as a result of which, after fixation, non-fixed dyestuff can easily be washed out. Such dyestuffs are suitable for the production of brown shades, in particular in the form of the metal complexes.

The azo dyestuffs containing disulphimide and acylatable amino groups are obtained, for example, by coupling diazonium compounds with azo components of which at least one contains at least one disulphimide group and at least one contains at least one substituent which can be converted into an acylatable amino group such as, e.g. a nitro or saponifiable acylamino group, and then reducing the nitro to primary amino groups or saponifying the acylamino groups. In their original state, azo components can also contain acylatable amino groups. As diazo components those of the benzene series are advantageously chosen, possibly those of the naphthalene series also; as azo components advantageously hydroxynaphalenes and/or aminonaphthalenes and their sulphonic acids and carboxylic acids as well as 5-amino- or 5-hydroxypyrazole compounds are chosen. If the diazo and azo components contain metallisable groups, then the azo dyestuffs obtained therefrom are treated, advantageously before the substitution of the amino groups according to the invention, with heavy metal of the atomic numbers 24–29, i.e. for example with agents introducing copper, chromium or cobalt. Preferred azo dyestuffs containing heavy metal are principally the complex copper, cobalt, and chromium compounds of o,o'-dihydroxyazo and of o-hydroxy-o'-carboxyazo dyestuffs. In the case of chromium and cobalt compounds there should be, advantageously, 1 heavy metal atom to 2 mols of dyestuff used. In the case of chromium complexes, one of the two azo dyestuffs bound to the chromium atom must contain at least one disulphimide group and only one of the two dyestuffs must contain at least one acylatable amino group.

The diazo or azo components containing disulphimide groups are obtained in their turn by known methods by condensing 1 mol of a compound containing sulphonic acid halide groups with 1 mol of a compound containing sulphonic acid amide groups, the condensation being performed in the presence of a mineral acid binding agent.

Components which are symmetrical with regard to the disulphimide group can also be obtained by condensation of 2 mols of a compound containing sulphonic acid halide groups with 1 mol of ammonia or a substance giving off ammonia.

Aminophthalocyanine dyestuffs used according to the invention which contain disulphimide groups are obtained, for example, from phthalocyanine sulphonic acid halides which possibly also contain sulphonic acid groups and advantageously contain copper, by condensation with aryl sulphonic acid amides having nitro groups or saponifiable acylamino groups, the condensation being performed in the presence of an acid binding agent and then reduction of the nitro groups to amino groups or saponification of the acylamino groups to amino groups. Other phthalocyanine dyestuffs used according to the invention are obtained, for example, by condensing phthalocyanine sulphonic acid halides with organic, advantageously aromatic, amino compounds which already contain at least one disulphimide group and at least one nitro or saponifiable acylamino group, whereupon again the nitro groups are reduced or the acylamino groups are saponified.

Nitro dyestuffs used according to the invention are obtained for example, by condensing aminodiarylamino sulphonic acids or similar p-phenylenediamine derivatives with nitrodiaryl disulphimides containing reactive halogen which have acylamino groups which can be hydrolysed and then saponifying these acylamino groups.

Anthraquinone dystuffs used according to the invention are obtained in a similar manner, for example by condensing amino disulphimide compounds containing nitro groups or saponifiable acylamino groups, with anthraquinones having reactive substituents, e.g. with 1-amino-4-bromoanthraquinone-2-sulphonic acid or a derivative thereof halogenated or sulphonated in the 6- and/or 7-position, then reducing the nitro groups to amino groups or saponifying the acylamino groups.

The intermediate products necessary for the various dyestuff classes which contain amino and disulphimide groups and also nitro or acylamino groups can also be produced by the methods already described from corresponding sulphonic acid halides and sulphonic acid amides or ammonia.

The new dyestuffs according to the invention correspond to the general formula

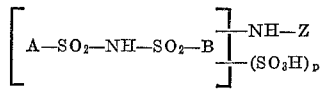

wherein

A represents the radical of an organic dyestuff,
B represents a possibly substituted hydrocarbon radical which can also contain chromophoric groups,
X represents a hydrogen atom or the equivalent of a cation,
Z represents a substituted amino group, the substituent of which contains at least one radical which is easily split off as anion or at least one C—C— multiple bond which is easily capable of addition, and
m, n and p represent positive whole numbers, and
m and n should each be at most 2 and p and m should together be at least 3.

The dyestuffs have good water solubility and are excellently suitable for the dyeing and printing of fibres containing hydroxyl groups, in particular natural and regenerated cellulose fibres, in the presence of agents which raise the pH value. The cellulose dyeings and prints obtained with these new dyestuffs are very pure and have, in particular, excellent wet fastness properties. The dyestuffs are also suitable for the dyeing and printing of natural and synthetic polyamides, for example, wool, silk and synthetic polyamide fibres.

From the above, it will be seen that of the dyestuffs of the general Formula I, principally the azo dyestuffs and, of these, the monoazo dyestuffs, are preferred. Preferred dyestuffs according to the invention contain in addition an aryl radical having at most two benzene nuclei as the radical B bound to the disulphimide group and the substituted amino group Z as its substituent. In particularly preferred cases, the radical B is the radical of a monoazo dyestuff.

Particularly valuable dyestuffs in the form of the free acid correspond to the formula

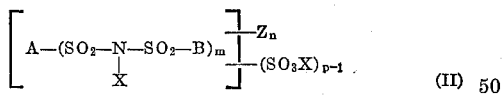

wherein

A represents the radical of an organic dyestuff,
B represents a member selected from the group consisting of radicals of the benzene, naphthalene and monoazo dye series,
Z represents a halogen-azinyl radical, and
p is a lower whole number.

In this formula A more precisely is the radical of a monazo dye, e.g. a benzene-azo-benzene dye, a benzene-azo-naphthalene dye, a benzene-azo-pyrazolone dye, a naphthalene-azo-naphthalene dye, which monoazo dyes contain the disulphimide group at any of the aromatic nuclei, and which may also contain heavy metals such as copper, chromium or cobalt in complex union, of a formazane dye, of an anthraquinone dye, and of a phthalocyanine dye.

Of the monoazo dyes, A preferably is the radical of a dye selected from the group consisting of the following classes of dyes:

(a) 4-(phenyl-azo)-5-pyrazolone dyes containing preferably at the phenyl radical the disulphimide group,
(b) 1-(phenyl-azo) - 2 - aminonaphthyl dyes containing preferably at the phenyl radical a sulphonic acid or a disulphimide group in o-position to the azo group,
(c) 2-(phenyl-azo) - 1 - hydroxynaphthyl dyes containing preferably at the phenyl radical a sulphonic acid group or a disulphimide group in o-position to the azo group,
(d) o,o'-Dihydroxy-phenyl-azo-naphthyl dyes containing also one of the metals chromium, cobalt and, preferably, copper in complex union,
(e) o,o'-Dihydroxy-naphthyl-azo-naphthyl dyes containing also one of the metals copper, chromium and cobalt in complex union,
(f) o,o'-Dihydroxy-phenyl-azo-pyrazole dyes containing a metal, especially copper, in complex union.

In the case of formazane dyes, A preferably is the radical of a (g) Copper complex compound of a sulphonated N-(2-hydroxyphenyl)-N'-(phenyl) - ms - phenyl formazane, containing the disulphimide group at the N'-phenyl radical.

In the case of anthraquinone dyes, A preferably is the radical of a (h) 4-amino-3-sulphonic acid-1-phenylamino-anthraquinone dye containing the disulphimide group at the phenylamino group.

In the case of phthalocyanine dyes, A preferably is the radical of (i) Sulphonated copper phthalocyanine dyes.

In the above formula, if B is a radical of the benzene series then it is, in particular, the unsubstituted phenyl radical; however this can also be substituted, e.g. by chlorine, or methyl. If B is a radical of the naphthalene series, then it is, in particular, the unsubstituted naphthyl radical. Preferably, however, B is the radical of a monoazo dyestuff, for example, the radical of a benzene-azo-benzene dye, the radical of a benzene-azo-pyrazolone dye and, in particular, the radical of an o,o'-dihydroxy-phenyl-azo-naphthyl dye containing copper in complex union.

Examples of the reactive radical Z are principally:

(a) Halogen-pyrimidyl radicals such as dihalogen pyrimidyl radicals, e.g. the 2,6-dichloro-pyrimidyl-(4) radical, which can contain a substituent in the remaining position, e.g. alkyl and in particular a further halogen atom such as, e.g. the 2,5,6-trichloropyrimidyl-(4) radical, the 2,6-dichloro-5-bromo-pyrimidyl-(4) radical, the 2,6-dichloro-5-methyl-pyrimidyl-(4) radical, the 2,6-dichloro-5-ethyl-pyrimidyl-(4) radical, (b) Halogen-1,3,5-triazinyl radicals which in the remaining position contain a substituent, in particular halogen, amino, alkylamino, arylamino or alkoxy groups, e.g. the 4,6-dichloro-1,3,5-triazinyl radical, the 4-chloro-6-amino-, or -6-methyl-amino- or -6-ethylamino- or -6-phenylamino, or -6-sulphophenylamino - 1,3,5 - triazinyl radical, the 4-chloro-6-methoxy- or -6-ethoxy-1,3,5-triazinyl radical, (c) Halogen-pyrimidoyl radicals, e.g. the 2,4-dichloropyrimidoyl-(6) radical.

Halogen in the radicals mentioned is, in particular, chlorine but it can also be bromine.

In addition, dyestuffs which contain the dichloropyrimidyl group and, especially, the trichloropyrimidyl group, are preferred. It is also pointed out that dyestuffs which are produced by reaction of amino compounds with tri- or tetra-halogen pyrimidines are possibly isomeric mixtures, the pyrimidine radical being bound to the amino group mainly in the 4-position.

The reactive group —NH—Z can be bound to A but, preferably, it is bound to B and $p$ is at most 4, advantageously 2–3.

Again of these dyestuffs, the most valuable have the following formula

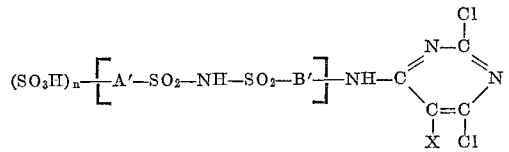

wherein

A' and B' each represent radicals of monoazo dyestuffs,
X is a member selected from the group consisting of H and Cl, and
$p$ is a whole number of at most 4.

In this formula A' is preferably the radical of a copper-containing o,o'-dihydroxy-phenyl-azo-pyrazole dyestuff and B' is preferably the radical of a copper-containing o,o'-dihydroxy-phenyl-azo-naphthyl dyestuff.

A further class of valuable dyestuffs has the following formula

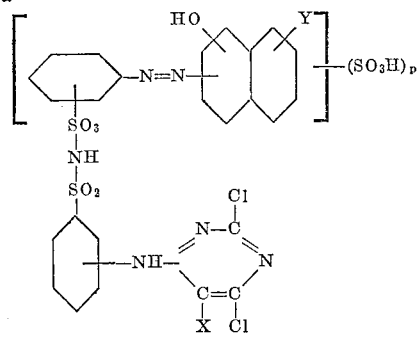

wherein
X is a member selected from the group consisting of H and Cl,

Y represents a member selected from the group consisting of hydrogen, lower fatty acid acylamino and benzoylamino radicals, and $p$ is a whole number of at most 4.

The following examples serve to illustrate the invention without limiting it in any way. Parts are given therein as parts by weight and their relationship to parts by volume is as that of grammes to cubic centimetres. The temperatures are in degrees centigrade.

EXAMPLE 1

25.3 parts of 1-aminobenzene-2,5-disulphonic acid are dissolved neutral in 300 parts of water and the solution is diazotised at 0–2° with 25 parts of 30% hydrochloric acid and 6.9 parts of sodium nitrite while cooling with ice. The solution obtained is added to the solution of 57 parts of the sodium salt of 4-hydroxynaphthyl-(1)-3'-dichloropyrimidylaminophenyl-(1')-disulphimide in 400 parts of water, which solution has been cooled to 0–5°, and the coupling is performed at a pH of 6–7. On completion of the coupling, the dyestuff of the formula

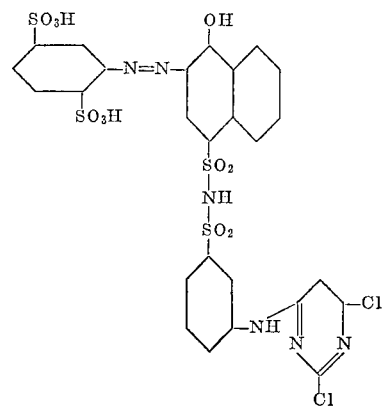

is precipitated with sodium chloride, filtered off, washed with sodium chloride solution and dried in vacuo at 40–50°. It dissolves easily in cold water with an orange-red shade.

The 4-hydroxynaphthyl-(1)-3' - dichloropyrimidylaminophenyl-(1')-disulphimide is produced by condensing 1-(p-toluene sulphonyloxy)-naphthalene-4-sulphonic acid amide with m-nitrobenzene sulphochloride, saponifying the toleuene sulphonyloxy group, reducing the nitro compound to the amine and condensing the amine so obtained with 2,4,6-trichloropyrimidine.

If cotton is treated at 50° in the foulard with a 1% solution of this dyestuff which solution also contains 20 parts of sodium carbonate and 200 parts of urea per litre, the impregnated goods are dried, then heated for 4 minutes at 140–160° and finally soaped at the boil for 30 minutes, a level, orange-red dyeing is obtained which has good fastness to washing.

Dyestuffs are obtained by this method with the diazotisable amines mentioned in column II of the following table and the azo components mentioned in column III thereof which dye cotton in the shades given in column V of the table.

Table 1

| I | II Diazo component | III Acylatable compound | III Acylating or azinylating agent | IV pH value | V Shade on cotton |
|---|---|---|---|---|---|
| 1 | 1-aminobenzene-2,4-disulphonic acid. | 1-hydroxynaphthyl-(3)-3'-aminophenyl-(1')-disulphimide. | 2,4,6-trichloropyrimidine | 7-8 | Orange. |
| 2 | 1-aminobenzene-2,5-disulphonic acid. | 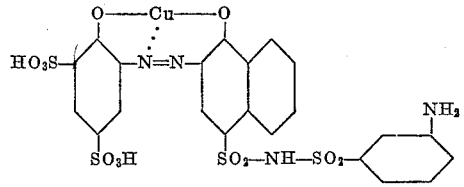 | 2,4,6-trichloro-s-triazine | 5-6 | Yellow. |
| 3 | 2-amino-4'-chlorodiphenyl-1,1'-disulphimide. | 1-amino-8-hydroxynaphthalene-3,6-disulphonic acid. | 2,4,6-trichloro-5-ethylpyrimidine. | 6-7 | Red. |
| 4 | 2-amino-4'-methyldiphenyl-1,1'-disulphimide. | ----do---- | 2,4,6-trichloro-5-bromopyrimidine. | 7-8 | Do. |
| 5 | ----do---- | 2-amino-8-hydroxynaphthalene-6-sulphonic acid. | 2,4-dichloro-6-methoxy-s-triazine. | 7-8 | Orange-red. |
| 6 | ----do---- | 2-amino-5-hydroxynaphthalene-7-sulphonic acid. | 2,4,6-trichloro-5-methylpyrimidine. | 7-8 | Orange. |
| 7 | 3-amino-4-sulphophenyl-(1)-naphthyl-(2')-disulphimide. | 1-amino-8-hydroxynaphthalene-4,6-disulphonic acid. | 2,4,5-trichloro-6-methylpyrimidine. | 7-8 | Red. |
| 8 | 3-amino-4-sulpho-3'-acetylaminodiphenyl-1,1'-disulphimide → 2-hydroxynaphthalene-6,8-disulphonic acid, saponified. | 2-amino-5-hydroxynaphthalene-7-sulphonic acid. | 2,4,5,6-tetrachloropyrimidine | 7-8 | Orange. |
| 9 | 3-amino-4-sulpho-4'-dichlorodiphenyl-1,1'-disulphimide. | 1-(3'-aminobenzoylamino)-8-hydroxynaphthalene-3,6-disulphonic acid. | 2,4,6-trichloropyrimidine | 7-8 | Red. |
| 10 | ----do---- | 2-amino-5-hydroxynaphthalene-7-sulphonic acid. | 2,4,5,6-tetrachloropyrimidine | 7-8 | Orange. |

EXAMPLE 2

71.9 parts of the aminomonoazo dyestuff of the formula

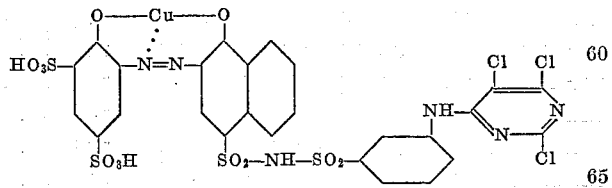

(obtained by coupling diazotised 2-amino-1-hydroxybenzene-4,6-disulphonic acid with 4-hydroxynaphthyl-(1)-3'-aminophenyl-(1')-disulphimide in an alkaline medium and treating the amino-monoazo dyestuff obtained with agents giving off copper) are dissolved in 800 parts of water. 24 parts of tetrachloropyrimidine are added to this solution at 40–50° and the pH value of the reaction solution is kept at 6–6.5 by the gradual addition dropwise of sodium carbonate solution. As soon as no more aminomonoazo dyestuff can be traced by diazotising and coupling a small sample, the new dyestuff of the formula is precipitated by the addition of sodium chloride, filtered off and dried in vacuo at 40–50°. The dark powder dissolves in water with a bordeaux red colour.

If cotton is treated at 20° in the foulard with a 2% aqueous solution of this dyestuff, dried, and then treated with a 1% sodium hydroxide solution containing 30% sodium chloride, then steamed for 5 minutes at 100–103°, finally rinsed and soaped at the boil for 30 minutes, then a bordeaux red dyeing which is fast to boiling is obtained.

Dyestuffs with similar properties are obtained if, instead of the aminomonoazo dyestuff given in the following Table 2 are used and these are reacted with the corresponding number of parts of the acylating or azinylating agents given in the table.

Table 2

| No. | Amino azo dyestuff | Complexly bound metal | Acylating or azinylating agent | Shade on cotton |
|---|---|---|---|---|
| 1 | 1-amino-2-hydroxybenzene-3,5-disulphonic acid ⟶ 1-hydroxynaphthyl-(4)-3'-aminophenyl-(1')-disulphimide. | Cu | 2,4,5,6-tetrachloropyrimidine. | Red. |
| 2 | 1-amino-2-hydroxybenzene-3,5-disulphonic acid ⟶ 2-hydroxynaphthyl-(6)-4'-aminophenyl-(1')-disulphimide. | Cu | 2,4-dichloro-6-amino-s-triazine. | Do. |
| 3 | 4-amino-5-hydroxy-2-methoxyphenyl-(1)-3'-nitrophenyl-(1')-disulphimide ⟶ 1-amino-8-hydroxynaphthalene-2,4-disulphonic acid, reduced. | Cu | 2,4,5,6-tetrachloropyrimidine. | Blue. |
| 4 | 4-amino-5-hydroxy-2-methoxyphenyl-(1)-3'-nitro-4'-sulphophenyl-(1')-disulphimide ⟶ 1-phenylamino-8-hydroxynaphthalene-4-sulphonic acid, reduced. | Cu | 2,4,6-trichloro-s-triazine. | Do. |
| 5 | 2,2'-diamino-1,1'-diphenyldisulphimide ⟶ 1-(3'-amino-4'-sulphophenyl)-3-methyl-5-pyrazolone. | | 2,4-dichloro-6-ethoxy-s-triazine. | Yellow. |
| 6 | 2-aminophenyl-(1)-3'-acetylaminophenyl-(1')-disulphimide a ⟶ 2-amino-8-hydroxynaphthalene-6-sulphonic acid, saponified. | | 2,4,6-trichloro-5-bromopyrimidine. | Red. |

Table 2—Continued

| No. | Amino azo dyestuff | Complexly bound metal | Acylating or azinylating agent | Shade on cotton |
|---|---|---|---|---|
| 7 | 3-amino-4-sulphophenyl-(1)-3'-acetylaminophenyl-(1')-disulphimide → 2-hydroxynaphthalene-6,8-disulphonic acid, saponified → 1-amino-3-methylbenzene. | | 2,4,5,6-tetrachloropyrimidine. | Yellow-orange. |
| 8 | 3-amino-4-sulphophenyl-(1)-3'-acetylaminophenyl-(1')-disulphimide → 1-hydroxynaphthalene-4,6-disulphonic acid, saponified → 1-amino-3-methylbenzene. | | do | Do. |

EXAMPLE 3

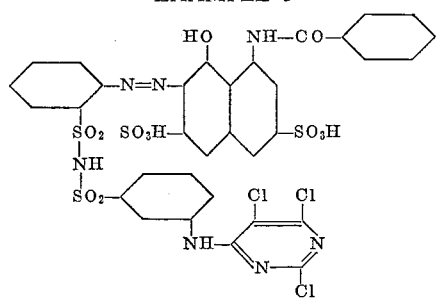

50.8 parts of the condensation product of the formula

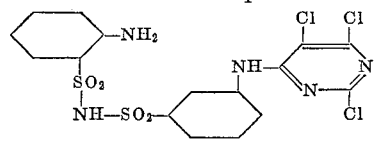

in the form of the sodium salt are dissolved in 500 parts of warm water, the solution is acidified with 25 parts of 30% hydrochloric acid and 6.9 parts of sodium nitrite are added at 5–10°. On completion of the diazotisation, a neutralised solution of 42.3 parts of 1-benzoylamino-8-hydroxynaphthalene-3,6-disulphonic acid in 200 parts of water is added to the mixture and the pH value of the solution is adjusted at 10–20° to 7–7.5 with sodium bicarbonate. On completion of the coupling, the new dyestuff is precipitated with sodium chloride, filtered off and dried in vacuo at 50–60°. It is a red powder which easily dissolves in water with a red colour.

The diazo component used in this example is produced as follows:

32.7 parts of 2,3'-diaminodiphenyl-1,1'-disulphimide obtained by known methods by condensing 2-nitrobenzene-1-sulphochloride and 3-nitrobenzene sulphamide and then reducing, are pasted in 200 parts of water and a solution is obtained by adjusting the pH to 6.5 by the addition of sodium hydroxide. 21.8 parts of 2,4,5,6-tetrachloropyrimidine are added to the solution and it is stirred at 30°, the pH being kept between 6.5–7 by the addition dropwise of sodium carbonate solution. On completion of the reaction, the condensation product is precipitated by the addition of sodium chloride, filtered off and washed with sodium chloride solution.

If cotton is treated in the foulard at 50° with a 2% solution of this dyestuff which solution contains 5% of urea and 1% of sodium carbonate, then dried at 80°, then steamed for 5–10 minutes at 100–110° and soaped at the boil, then a red dyeing is obtained which has excellent fastness to washing and good fastness to light.

Dyestuffs having similar properties are obtained if aminodiphenyl disulphimide compounds, obtained by condensing the diamines given in column 2 of the following table with 1 mol of the compounds given in column 3, are diazotised and coupled with the azo components given in column 4 at the pH values given in column 5.

Table 3

| No. | Diamino compound | Acylating or azinylating agent | Azo component | pH of the coupling | Shade on cotton |
|---|---|---|---|---|---|
| 1 | 2,3'-diaminodiphenyl-1,1'-disulphimide. | 2,4,6-trichloropyrimidine | 1-benzoylamino-8-hydroxynaphthalene-4,6-disulphonic acid. | 7–8 | Red. |
| 2 | do | 2,4-dichloro-6-amino-s-triazine | 1-carbethoxyamino-8-hydroxynaphthalene-3,6-disulphonic acid. | 7–8 | Do. |
| 3 | 2,4'-diaminodiphenyl-1,1'-disulphimide. | 2,4,5,6-tetrachloropyrimidine | 1-hydroxynaphthalene-4,7-disulphonic acid. | 7–8 | Red-orange. |
| 4 | do | 2,4-dichloropyrimidine-6-carboxylic acid chloride. | 1-hydroxynaphthalene-3,6-disulphonic acid. | 7–8 | Do. |
| 5 | 3,3'-diamino-4-sulphodiphenyl-1,1'-disulphimide. | 2,4,5,6-tetrachloropyrimidine | 1-benzoylamino-8-hydroxynaphthalene-3,6-disulphonic acid. | 7–8 | Red. |
| 6 | do | 2,4,6-trichloro-s-triazine | 1-hydroxynaphthalene-4-sulphonic acid. | 6–7 | Orange-red. |
| 7 | 3,4'-diamino-4-sulphodiphenyl-1,1'-disulphimide. | 2,4-dichloro-6-phenylamino-s-triazine | 1-hydroxynaphthalene-4,6-disulphonic acid. | 7–8 | Do. |
| 8 | do | 2,4,5,6-tetrachloropyrimidine | 2-acetylamino-5-hydroxynaphthalene-7-sulphonic acid. | 7–8 | Orange. |
| 9 | do | do | 2-hydroxynaphthalene-6-sulphonic acid. | 7–8 | Do. |
| 10 | 3,3'-diamino-4-sulphodiphenyl-1,1'-disulphimide. | do | 2-hydroxynaphthalene-6,8-disulphonic acid. | 7–8 | Do. |
| 11 | do | do | 2-benzoylamino-5-hydroxynaphthalene-7-sulphonic acid. | 7–8 | Do. |
| 12 | 5-aminonaphthyl-(1)-3'-amino-4'-sulphophenyl-(1')-disulphimide. | do | 2-hydroxynaphthalene-6,8-disulphonic acid. | 7–8 | Do. |
| 13 | do | 2,4,6-trichloro-s-triazine | 2-hydroxynaphthalene-6-sulphonic acid. | 7–8 | Do. |
| 14 | do | 2,4,6-trichloropyrimidine | 1-benzoylamino-8-hydroxynaphthalene-3,6-disulphonic acid. | 7–8 | Red. |
| 15 | 5-aminonaphthyl-(1)-2'-aminophenyl-(1')-disulphimide. | 2,4,5,6-tetrachloropyrimidine | do | 7–8 | Do. |
| 16 | do | 2,4-dichloro-6-ethylamino-s-triazine | 1-hydroxynaphthalene-3,6-disulphonic acid. | 7–8 | Orange-red. |

EXAMPLE 4

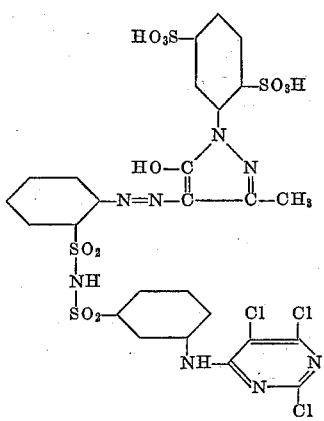

50.8 parts of the condensation product described in example 3 from 2,3'-diaminodiphenyl-1,1'-disulphimide and tetrachloropyrimidine are diazotised in the usual way and coupled at 10–20° and a pH of 6–7 with 35.0 parts of 1-(2',5'-disulphophenyl)-3-methyl-5-pyrazolone, the coupling being performed in the presence of sodium bicarbonate. The dyestuff is precipitated by the addition of potassium chloride, filtered off and carefully dried in vacuo. It is a yellow powder which dissolves in water with a yellow colour.

If cotton is dyed with this dyestuff under the conditions described in example 3, then a very pure, greenish yellow dyeing is obtained which has excellent fastness to washing and light.

Dyestuffs having similar properties are obtained if the diaminodiphenyl disulphimide compounds given in column 2 of the following table are condensed with 1 mol of the acylating or azinylating agents given in column 3, the condensation products are diazotised and the diazonium compounds obtained are coupled with the azo components given in column 4 as described in this example.

Table 4

| No. | Diamino compound | Acylating or azinylating agent | Azo component | Shade on cotton |
|---|---|---|---|---|
| 1 | 2,3'-diamino-diphenyl-1,1'-disulphimide. | 2,4,6-trichloro-s-triazine. | 1-(2'-chloro-5'-sulpho-phenyl)-3-methyl-5-pyrazolone. | Yellow. |
| 2 | ____do____ | 2,4,5,6-tetra-chloropyrimidine. | 1-naphthyl-(2')-3-methyl-5-pyrazolone-4',8'-disulphonic acid. | Do. |
| 3 | ____do____ | 2,4,6-trichloro-pyrimidine. | 1-(2',5'-disul-phophenyl)-3-methyl-5-pyrazolone. | Do. |
| 4 | 3,3'-diamino-diphenyl-1,1'-disulphimide-4-sulphonic acid. | 2,4-dichloro-6-amino-s-triazine. | 3-methyl-5-pyrazolone. | Do. |
| 5 | ____do____ | 2,4-dichloro-6-methoxy-s-triazine. | 1-(2',5'-dichloro-4'-sulpho-phenyl)-3-methyl-5-pyrazolone. | Do. |
| 6 | 3,4-diamino-diphenyl-1,1'-disulphimide-4-sulphonic acid. | 2,4-dichloro-6-(2'-sulpho-phenylamino)-s-triazine. | 1-phenyl-3-methyl-5-pyrazolone. | Do. |

EXAMPLE 5

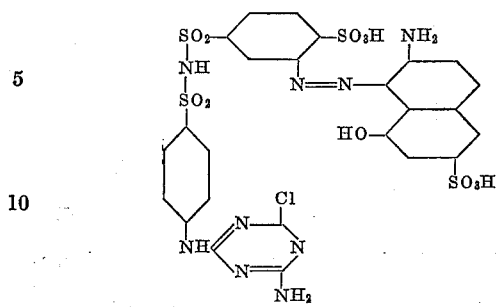

52.8 parts of the diazo component produced by condensation of 3,4'-diaminodiphenyl-1,1'-disulphimide-4-sulphonic acid and 4,6-dichloro-2-amino-s-triazine are diazotised in the usual way. The suspension of the diazonium compound is added to a suspension of 25.1 parts of 2-amino-8-hydroxynaphthalene-6-sulphonic acid in 200 parts of water and, at 10–20°, the pH of the coupling mixture is adjusted to 4–5 with sodium acetate. On completion of the coupling, the dyestuff is precipitated by the addition of sodium chloride, filtered off and carefully dried in vacuo.

It is a red powder which dissolves in water with a red colour.

If cotton is dyed with this dyestuff under the conditions described in Example 3, then a red dyeing which is fast to washing is obtained.

Dyestuffs having similar properties are obtained if the diaminodiphenyl disulphimide compounds given in column 2 of the following table are condensed with 1 mol of the acylating or azinylating agents given in column 3, the condensation products are diazotised and the diazonium compounds are coupled, according to this example, with the azo components given in column 4 of the table.

Table 5

| No. | Diamino compound | Acylating or azinylating agent | Azo component | Shade on cotton |
|---|---|---|---|---|
| 1 | 2,3'-diaminodi-phenyl-1,1'-disulphimide. | 2,4,5,6-tetra-chloropyrimi-dine. | 2-aminonaph-thalene-5,7-disulphonic acid. | Orange. |
| 2 | ____do____ | 2,4,6-trichloro-pyrimidine. | ____do____ | Do. |
| 3 | ____do____ | 2,4,6-trichloro-s-triazine. | ____do____ | Do. |
| 4 | 2,3'-diamino-4-chlorodiphen-yl-1,1'-disul-phimide. | 2,4-dichloro-6-(4'-sulpho-phenylami-no)-s-triazine. | 2-aminonaph-thalene-3,6-disulphonic acid. | Do. |
| 5 | 3,4'-diamino-diphenyl-1,1'-disulphimide-4-sulphonic acid. | 2,4,6-trichloro-5-bromopy-rimidine. | 2-aminonaph-thalene-6-sul-phonic acid. | Do. |
| 6 | ____do____ | 2,4,5,6-tetra-chloropyrimi-dine. | 2-amino-8-hy-droxynaph-thalene-6-sul-phonic acid. | Red. |
| 7 | ____do____ | 2,4-dichloro-pyrimidyl-6-carboxylic acid chloride. | 2-aminonaph-thalene-7-sul-phonic acid. | Orange. |

EXAMPLE 6

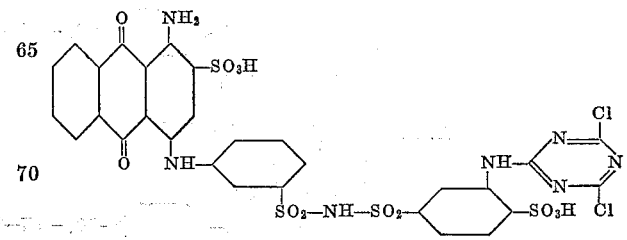

20 parts of cyanuric chloride are dissolved in 100 parts of acetone and the solution is poured while stirring strongly into 200 parts of ice water. A solution of 71.6 parts of the dyestuff of the formula

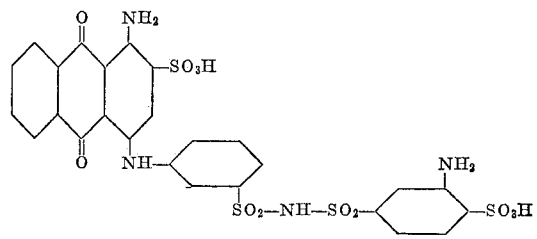

(obtained by condensing 4-bromo-1-aminoanthraquinone-2-sulphonic acid with 3,3'-diaminodiphenyl-1,1'-disulphimide-4-sulphonic acid) in 500 parts of water is added to this suspension at 0–5°, care being taken that the pH of the mixture is kept at 4–4.5 by the simultaneous addition of sodium carbonate. On completion of the reaction, the pH is adjusted to 7 and the new dyestuff is precipitated by the addition of sodium chloride, filtered off and washed with sodium chloride solution. After drying in vacuo at 20–25°, the dyestuff is a blue powder which dissolves in water with a blue colour.

If cotton is treated at 20° in the foulard with a 1% solution of the new dyestuff with the addition of 15 parts of sodium carbonate per 1000 parts liquor, rolled up, left for 2 hours at room temperature, then rinsed and soaped for 30 minutes at the boil, then a pure blue dyeing is obtained which has good fastness to light and very good fastness to washing.

Similar dyestuffs are obtained if the anthraquinone dyestuff mentioned in this example is replaced by a corresponding number of parts of those given in the following table and the cyanuric chloride is replaced by an equivalent amount of an acylating or azinylating agent given in column 3 thereof.

Table 6

| No. | Anthraquinone dyestuff | Acylating or azinylating agent | Shade on cotton |
|---|---|---|---|
| 1 | | 2,4,5,6-tetrachloro-pyrimidine. | Blue. |
| 2 | | 2,4,6-trichloro-pyrimidine. | Do. |
| 3 | | 2,4,5,6-tetrachloro-pyrimidine. | Do. |
| 4 | | 2-amino-4,6-dichloro-s-triazine. | Do. |
| 5 | | 2,4-dichloro-6-(3'-sulphophenyl-amino)-s-triazine. | Do. |
| 6 | | 2,4,5,6-tetrachloro-pyrimidine. | Do. |

EXAMPLE 7

57.6 parts of copper phthalocyanine in 270 parts of chlorosulphonic acid are heated for 3 hours at 145°. The mixture is then allowed to cool to 75° and 33.5 parts of thionyl chloride are added dropwise within 1 hour. The whole is stirred for 3 hours at 70–75°, it is then cooled to room temperature, after which it is poured onto 1500 parts of ice. The suspension formed is filtered and the residue is washed with 500 parts of 1% hydrochloric acid. The filter cake is then pasted in 500 parts of water and 300 parts of ice and the pH of the suspension is adjusted to 7 with caustic soda lye. A solution of 40.4 parts of 3-nitrobenzene sulphamide in 400 parts of water is added, the pH of which solution has been adjusted to 9 with caustic soda lye. The temperature is raised to 60–65° and the pH is kept at 8–8.5 by the addition of dilute sodium carbonate solution. When the pH remains constant, the reaction solution is cooled to 40° and 120 parts of sodium hydrosulphite are added in portions to reduce the nitro group, the pH being kept at 8 by the addition of dilute caustic soda lye. The mixture is then made acid with hydrochloric acid, heated, and the dyestuff is precipitated by the addition of sodium chloride. It is filtered off and washed with 500 parts of 10% salt solution made slightly acid with hydrochloric acid. The filter cake is stirred in 1000 parts of water and the pH is adjusted to 6.5 by the addition of caustic soda lye. 25 parts of 2,4,5,6-tetrachloropyrimidine are added to this solution and the temperature is raised to 60–65°. The pH of the mixture is kept between 5 and 6.5 by the addition of dilute sodium carbonate solution. As soon as no more primary amino groups can be traced, the dyestuff is salted out, filtered off and dried in vacuo at 60°.

If cotton is impregnated with an aqueous solution of the dyestuff as described in Example 1 in the presence of sodium carbonate and urea, squeezed out and heated for 2 minutes at 140–150°, then after soaping, a pure blue dyeing is obtained. The dyed material has very good fastness to wet and light.

If, in this example, the 2,4,5,6-tetrachloropyrimidine is replaced by 18.5 parts of 2,4,6-trichloropyrimidine or by 18.6 parts of 1,3,5-trichlorotriazine, then dyestuffs having similar good properties are obtained.

tetrachloropyrimidine are added within 1 hour. The pH is kept at 6.5–7 by the gradual addition of sodium carbonate. As soon as no more free amino groups can be traced, the new dyestuff is precipitated by the addition of sodium chloride, filtered off and dried in vacuo at 40–50°. It is a dark powder which dissolves in water with a grey colour.

If, in the above example, instead of 22 parts of 2,4,5,6-tetrachloropyrimidine, 18.5 parts of 2,4,6-trichloropyrimidine are used, then a dyestuff having similarly good properties is obtained.

If cotton is treated at 50° in the foulard with a 1% aqueous solution of this dyestuff, which solution also contains 20 parts of sodium carbonate and 200 parts of urea per 1000 parts of liquor, the impregnated goods are dried, thereupon heated for 4 minutes at 140–160° and finally soaped at the boil for 30 minutes, then a very level, grey dyeing which is fast to washing is obtained.

EXAMPLE 9

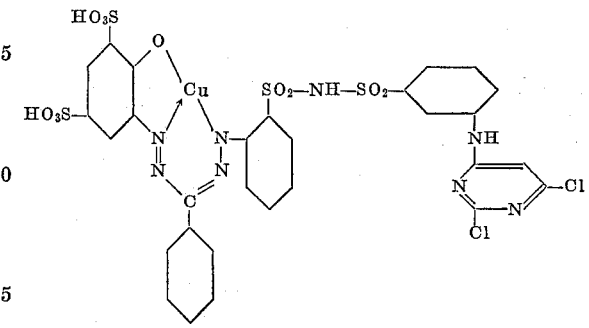

26.9 parts of 2-amino-1-hydroxybenzene-4,6-disulphonic acid are indirectly diazotised by the usual method. The suspension of the diazonium compound is then added, while stirring well at 0–10°, to a suspension of 20.4 parts of phenyl formyl acetic acid ethyl ester in 200 parts of

EXAMPLE 8

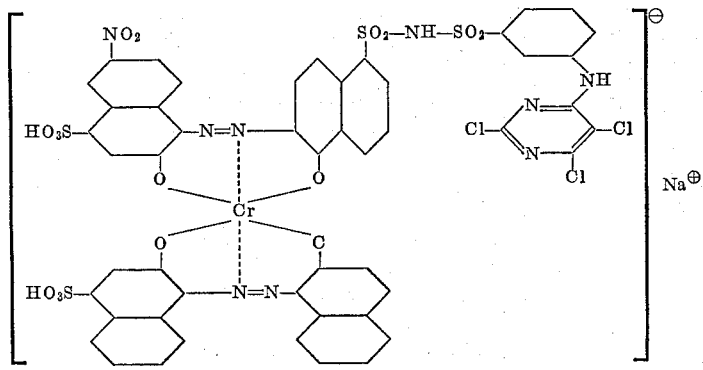

67.3 parts of the aminoazo dyestuff produced by coupling 6-nitro-1-diazo-2-hydroxynaphthalene-4-sulphonic acid with 1-hydroxynaphthyl-(5)-3'-aminophenyl-(1')-disulphimide in the presence of sodium carbonate, are dissolved at 80° in 500 parts of water. Sodium carbonate is added to the solution until the pH is 10–11 and then 44 parts of the 1:1 chromium complex of the monoazo dyestuff from 1-diazo-2-hydroxynaphthalene-4-sulphonic acid and 2-hydroxynaphthalene are added. The mixture is stirred for 1 hour at 80–85°, the pH being kept between 10 and 11. It is then cooled to 20–30°, the pH is adjusted to 6.5–7 with acetic acid and 22 parts of 2,4,5,6- water, 250 parts of dioxan and 10.5 parts by volume of a 10 N-caustic soda lye. This addition is made in the presence of amounts of sodium carbonate so that afterwards the reaction mixture has a weakly phenolphthalein alkaline reaction. On completion of the coupling, the pH is adjusted to about 8 by the addition of concentrated hydrochloric acid, the mixture is diluted and brought to the boil. After adding sufficient caustic soda lye to ensure that there is a strong alkaline reaction until the end of the saponification, the reaction mixture is boiled for 10–20 minutes.

The solution of the saponification product is then made acid to litmus paper with glacial acetic acid and then coupled at 0–10° with a diazonium salt solution prepared by diazotising 47 parts of condensation product from 2,3'-diamino-1,1'-diphenyldisulphimide and 1 mol of 2,4,6-trichloropyrimidine, which diazonium salt solution has been made neutral.

A copper sulphate solution, corresponding to 7 parts of copper is then added to the coupling mixture. After heating for a short time at 45°, the copper-containing dyestuff is precipitated by the addition of sodium chloride, filtered off, washed with sodium chloride solution and carefully dried in vacuo. It is a dark powder which dissolves in water with a blue colour.

If cotton is impregnated with a 2% solution of this dyestuff which also contains 90 parts of urea per 1000 parts, the goods are dried and then impregnated with a solution containing 10 parts of sodium hydroxide and 300 parts of sodium chloride per litre, steamed for 1 minute at 100–101°, soaped at the boil, rinsed and dried, then a blue dyeing is obtained which is fast to washing.

Dyestuffs having similar properties are obtained if, instead of the condensation product from 2,3'-diamino-1,1'-diphenyl disulphimide and 2,4,6-trichloropyrimidine, equivalent amounts of the condensation products from 2,4'-diamino-1,1'-diphenyl disulphimide and 2,4,5,6-tetrachloropyrimidine or 2,4,6-trichloro-s-triazine or 2,4-dichloro-6-methylamino-s-triazine are used.

is precipitated by the addition of sodium chloride, filtered off and washed with sodium chloride solution. The filter cake is dissolved in 2000 parts of water with a neutral reaction and a solution of 60 parts of crystallised copper sulphate in 400 parts of water is added. The pH of the solution is adjusted to 5 by the addition of 30 parts of crystallised sodium acetate and a little acetic acid, whereupon 300 parts of a 3% hydrogen peroxide solution are added dropwise within 30 minutes at a temperature of 40°. The di-copper complex dyestuff is precipitated with the aid of sodium chloride, filtered off, washed with sodium chloride solution and dried. It is a brown-black powder which dissolves in water with a brown colour.

The tetrazo component used in this example is produced by condensing 3-nitro-4-chlorobenzene sulphochloride with 3-nitrobenzene sulphamide, exchanging the halogen atom for a hydroxyl group by boiling several hours with caustic soda lye or sodium carbonate solution and reducing the nitro compound to the diamino compound.

To attain wet-fast dyeings, 2 parts of the dyestuff obtained according to the above example are dissolved in a dye bath containing 400 parts of water. 100 parts of cotton are introduced at 40–45° and the bath is heated within 30 minutes to 90° while adding 50 g. of sodium

EXAMPLE 10

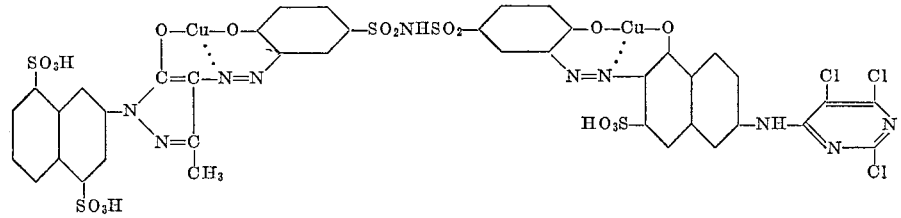

34.3 parts of 4-hydroxy-3,3'-diaminodiphenyl-1,1'-disulphimide are dissolved in 200 parts of water and the solution is diazotised at 0–5° with 50 parts of 30% hydrochloric acid and 13.8 parts of sodium nitrite. The yellow tetrazo suspension, which is acid to congo paper, is added to a solution cooled to 0–5° of 38.4 parts of 1-naphthyl-(2')-3-methyl-5-pyrazolone-4',8' - disulphonic acid (in the form of the alkali metal salt) in 100 parts of water, the pH of the coupling being kept at 4–5 by the addition of sodium acetate. The monoazo diazo dyestuff is formed after about 30 minutes. A suspension of 42 parts of 2-trichloropyrimidylamino-5-hydroxy-naphthalene-7-sulphonic acid in 200 parts of water is added and, at the same time, the pH of the coupling is raised to 8–9 by the addition of sodium carbonate. On completion of the coupling, the disazo dyestuff of the formula chloride per litre in portions. At the end of this time, 20 parts of sodium carbonate per litre are added and dyeing is performed for another 60 minutes at this temperature. The goods are then rinsed and soaped at the boil for 30 minutes. A strong brown dyeing is obtained which is fast to light, washing and boiling.

Dyestuffs having similar properties are obtained if the diamines given in column 1 of the following table are tetrazotised and coupled with the coupling components given in columns 2 and 3 in that order and the dyestuff obtained is coppered as described in the above example. The reactive component can be bound to one of the two coupling components but it can also be introduced into the dyestuff molecule subsequently.

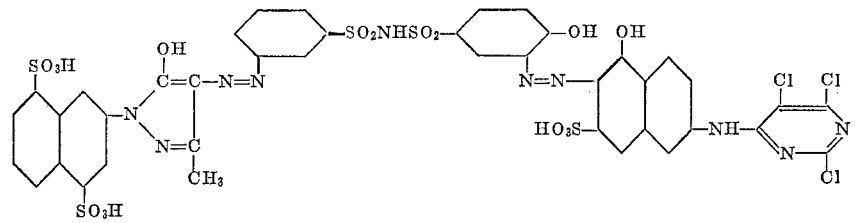

*Table to Example 10*

| No. | diamino compound | 1st azo component | 2nd azo component | acylating or azinylating agent | shade on cotton |
|---|---|---|---|---|---|
| 1 | 4-hydroxy-3,3'-diaminodiphenyl-1,1'-disulphimide. | 1-naphthyl-(2')-3-methyl-5-pyrazolone-4',8'-disulphonic acid. | 2-amino-5-hydroxynaphthalene-7-sulphonic acid. | 2,4,6-trichloro-s-triazine | Brown. |
| 2 | ___do___ | 1-naphthyl-(2')-3-methyl-5-pyrazolone-5',7'-disulphonic acid. | ___do___ | 2,4,5,6-tetrachloropyrimidine | Do. |
| 3 | ___do___ | ___do___ | 2-amino-8-hydroxynaphthalene-6-sulphonic acid. | ___do___ | Do. |
| 4 | ___do___ | 1-naphthyl-(2')-3-methyl-5-pyrazolone-4',8'-disulphonic acid. | ___do___ | ___do___ | Do. |
| 5 | ___do___ | 2-amino-6-hydroxynaphthalene-8-sulphonic acid. | 1-naphthyl-(2')-3-methyl-5-pyrazolone-4',8'-disulphonic acid. | ___do___ | Do. |
| 6 | ___do___ | ___do___ | 1-naphthyl-(2')-3-methyl-5-pyrazolone-5',7'-disulphonic acid. | ___do___ | Do. |
| 7 | ___do___ | ___do___ | ___do___ | 2,4,6-trichloro-s-triazine | Do. |
| 8 | 4-hydroxy-3,4'-diaminodiphenyl-1,1'-disulphimide. | 1-naphthyl-(2')-3-methyl-5-pyrazolone-4',8'-disulphonic acid. | 2-amino-5-hydroxynaphthalene-7-sulphonic acid. | 2,4,5,6-tetrachloropyrimidine | Do. |
| 9 | ___do___ | 1-naphthyl-(2')-3-methyl-5-pyrazolone-5',7'-disulphonic acid. | ___do___ | 2,4,6-trichloropyrimidine | Do. |
| 10 | ___do___ | ___do___ | ___do___ | 2,4,6-trichloro-s-triazine | Do. |
| 11 | ___do___ | 1-naphthyl-(2')-3-methyl-5-pyrazolone-4',8'-disulphonic acid. | 2-amino-8-hydroxynaphthalene-6-sulphonic acid. | 2,4,5,6-tetrachloropyrimidine | Do. |
| 12 | ___do___ | 1-naphthyl-(2')-3-methyl-5-pyrazolone-5',7'-disulphonic acid. | ___do___ | ___do___ | Do. |
| 13 | ___do___ | 2-amino-6-hydroxynaphthalene-8-sulphonic acid. | 1-naphthyl-(2')-3-methyl-5-pyrazolone-4',8'-disulphonic acid. | 2,4,6-trichloro-s-triazine | Do. |
| 14 | ___do___ | ___do___ | 1-naphthyl-(2')-3-methyl-5-pyrazolone-5',7'-disulphonic acid. | 2,4,5,6-tetrachloropyrimidine | Do. |
| 15 | ___do___ | 1-amino-8-hydroxynaphthalene-3,6,-disulphonic acid. | ___do___ | ___do___ | Do. |
| 16 | ___do___ | ___do___ | ___do___ | 2,4,6-trichloropyrimidine | Do. |

EXAMPLE 11

Cotton or regenerated cellulose is printed by one of the usual methods with the following printing paste:

30 parts of the dyestuff obtained according to Example 3,
200 parts of urea,
400 parts of water,
350 parts of sodium alginate, 5% aqueous solution,
20 parts of potassium carbonate, 1,000 parts.

After drying, the goods are steamed neutral for 10–15 minutes or the print is fixed for 5 minutes at 145–150°, the goods are then well rinsed and soaped for 30 minutes at the boil. A pure red print is obtained which is excellently fast to washing.

The printing paste described above keeps well on storing.

What we claim is:
1. Reactive dyestuff of the formula

wherein one of
A and B is a radical selected from the group consisting of
 (a) a monoazo 4-(phenyl-azo)-5-pyrazolonyl,
 (b) a monoazo 1-(phenyl-azo)-2-aminonaphthyl,
 (c) a monoazo 2 - (phenyl-azo)-1-hydroxynaphthyl,
 (d) a monoazo o,o'-dihydroxy-phenyl-azo-naphthyl containing a metal in complex union,
 (e) an o,o'-dihydroxy-naphthyl-azo-naphthyl containing a metal in complex union, and
 (f) an o,o'-dihydroxy-phenyl-azo-pyrazolonyl containing copper in complex union,
 the metal of (d) and (e) being a member selected from the group consisting of copper, chromium and cobalt;
the other of A and B is a member selected from the group consisting of phenyl, chlorophenyl, methylphenyl, naphthyl, a benzene-azo-benzene monoazo dye radical, a benzene-azo-pyrazolone monoazo dye radical and an o,o'-dihydroxyphenyl-azo-naphthyl monoazo dye radical containing copper in complex union;
Z is a member selected from the group consisting of monohalogen - 1,3,5-triazinyl, dihalogen-1,3,5-triazinyl, dihalogen-pyrimidyl-(4), trihalogen-pyrimidyl-(4) and dihalogen-pyrimidoyl-(6),
 the monohalogen-1,3,5-triazinyl being further ring-substituted with a member selected from the group consisting of amino, methylamino, ethylamino, phenylamino, sulfophenylamino, methoxy and ethoxy,
 the dihalogen-pyrimidyl-(4) being further ring-substituted with an alkyl of from 1 to 2 carbon atoms,
 said halogen substituent in Z being a member selected from the group consisting of chlorine and bromine;
each of —NH—Z and —SO₃H, independently, is bonded directly to an aryl ring of a member selected from the group consisting of A and B, the aryl ring being a member selected from the group consisting of a benzene ring and a naphthalene ring;
p is a positive whole number of at most 4, maximally two —SO₃H groups being bonded to one and the same aryl ring.

2. The reactive dyestuff of the formula
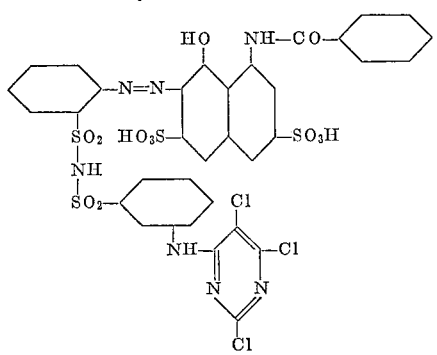
3. The reactive dyestuff of the formula
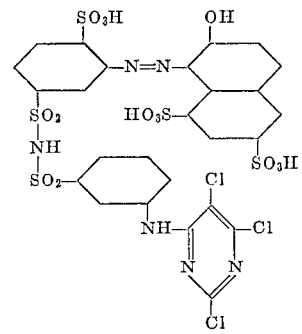
4. The reactive dyestuff of the formula
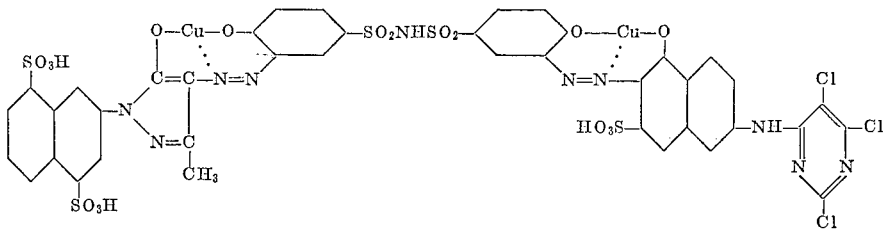
5. The reactive dyestuff of the formula
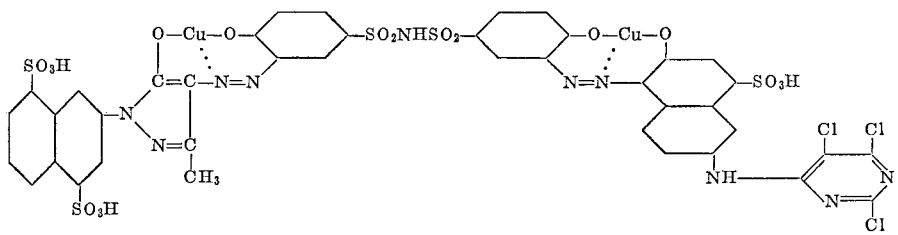
References Cited in the file of this patent
UNITED STATES PATENTS
| | | |
|---|---|---|
| 2,167,804 | Gubler et al. | Aug. 1, 1939 |
| 2,399,739 | Blackshaw et al. | Jan. 18, 1944 |
| 2,744,911 | Bolliger | May 8, 1956 |
| 2,766,231 | Bolliger | Oct. 9, 1956 |
| 2,978,289 | Barker et al. | Apr. 4, 1961 |
| 2,980,665 | Langley | Apr. 18, 1961 |
| 3,040,020 | Putter et al. | June 19, 1962 |
| 3,062,806 | Bidermann et al. | Nov. 6, 1962 |
FOREIGN PATENTS
| | | |
|---|---|---|
| 214,546 | Austria | Apr. 10, 1961 |